(12) United States Patent
Zeng et al.

(10) Patent No.: US 6,799,440 B2
(45) Date of Patent: Oct. 5, 2004

(54) OPTICAL FIBER DEPOSITION TUBE FUSED IN DEUTERIUM ATMOSPHERE FOR ATTENUATION IMPROVEMENT

(75) Inventors: Larry Q. Zeng, Euclid, OH (US); Victor L. Lou, Schenectady, NY (US); Frederic F. Ahlgren, Highland Heights, OH (US); Anil Raj Duggal, Niskayuna, NY (US)

(73) Assignee: General Electric Company, Pittsfield, MA (US)

( * ) Notice: Subject to any disclaimer, the term of this patent is extended or adjusted under 35 U.S.C. 154(b) by 211 days.

(21) Appl. No.: 09/683,853

(22) Filed: Feb. 22, 2002

(65) Prior Publication Data

US 2003/0159468 A1 Aug. 28, 2003

(51) Int. Cl.⁷ .............................................. C03B 17/04
(52) U.S. Cl. ................................ 65/32.5; 65/86; 65/426
(58) Field of Search ........................... 65/86, 32.5, 187, 65/192, 404, 426; 423/335; 385/123

(56) References Cited

U.S. PATENT DOCUMENTS

| | | | |
|---|---|---|---|
| 3,791,714 A | * | 2/1974 | Maurer .................... 385/142 |
| 4,389,230 A | | 6/1983 | Modone et al. |
| 4,445,918 A | * | 5/1984 | Modone et al. .............. 65/379 |
| 4,504,297 A | * | 3/1985 | Kosinski et al. .............. 65/426 |
| 4,515,612 A | | 5/1985 | Burrus, Jr. et al. |
| 4,573,762 A | * | 3/1986 | Joormann et al. ........... 385/142 |
| 5,658,363 A | * | 8/1997 | Ince et al. .................... 65/412 |
| 6,574,994 B2 | * | 6/2003 | Cain et al. .................... 65/391 |
| 6,614,977 B2 | * | 9/2003 | Johnson et al. ............. 385/129 |

FOREIGN PATENT DOCUMENTS

| | | | | |
|---|---|---|---|---|
| GB | 2148276 A | * | 5/1985 | ............ C03C/3/32 |
| JP | 58055341 A1 | * | 4/1983 | ........... C03B/37/00 |

OTHER PUBLICATIONS

R.W. Lee, R.C. Frank, and D.E. Swets, *Diffusion of Hydrogen and Deuterium in Fused Quartz*, the Journal of Chemical Physics, vol. 36, No. 4, Feb. 15, 1962, pp. 1062–1071.

J. Stone and C.A. Burrus, *Reduction of the 1.38 μm Water Peak in Optical Fibers by Deuterium–Hydrogen Exchange*, American Telephone and Telegraph Company, The Bell System Technical Journal, vol. 59, No. 8, Oct. 1980.

* cited by examiner

*Primary Examiner*—Steven P. Griffin
*Assistant Examiner*—Carlos Lopez

(57) ABSTRACT

A silica deposition tube is fused in a deuterium ($D_2$) gas atmosphere and optionally baked in a deuterium ($D_2$) gas atmosphere to substantially reduce the hydrogen content in the tube for decreased fiber attenuation. Alternatively, raw silica material is pre-treated in $D_2$ gas followed by fusing of the raw silica tube in a $D_2$ gas environment.

17 Claims, 2 Drawing Sheets

OPTICAL FIBER DEPOSITION TUBE FUSED IN DEUTERIUM ATMOSPHERE FOR ATTENUATION IMPROVEMENT

BACKGROUND OF INVENTION

The present invention relates to a new and improved tube, rod or the like produced from silica glass or other glass-like materials and a method for making the same. Particularly, this invention relates to a method for the production of elongated members from a silica melt. The present invention is particularly directed to the fusing of a silica deposition tube in a deuterium ($D_2$) gas atmosphere for decreased fiber attenuation. Alternatively, the deposition tube can be formed from a silica sand pretreated in a deuterium ($D_2$) gas atmosphere prior to fusing of the deposition tube.

Various types of elongated members have been formed continuously by melting of silica crystal or sand in an electrically heated furnace whereby the desired shape is drawn from the furnace through a suitable orifice or die in the bottom of the furnace as the raw material is melted. One apparatus for continuous production of fused silica glass tubing, for example, is a tungsten-lined molybdenum crucible supported vertically and having a suitable orifice or die in the bottom to draw cane, rods, or tubing. The crucible is surrounded by an arrangement of tungsten heating elements or rods which heat the crucible. The crucible, together with its heating unit, is encased in a refractory chamber supported by a water-cooled metal jacket. The crucible is heated in a reducing atmosphere of nitrogen and hydrogen.

An alternative apparatus provides fused silica glass tubing by feeding natural silica crystal into a refractory metal crucible heated by electrical resistance under a particular gas atmosphere to reduce the bubble content. The bubbles formed by gas entrapment between crystals and the molten viscous mass of fused silica glass do not readily escape from the molten glass and, hence, remain as bubbles or lines in the product drawn from the fused silica melt. By substituting a melting atmosphere gas which readily diffuses through the molten material (such as pure helium, pure hydrogen or mixtures of these gases) the gas pressure in the bubbles are reduced and thereby the bubble size is reduced. This process uses a mixture of 80% helium and 20% hydrogen by volume.

In a further alternative method, a product is obtained by continuously feeding a raw material of essentially pure silicon dioxide in particulate form into the top section of an induction-heated crucible, fusing the raw material continuously in an upper-induction heat zone of the crucible in an atmosphere of hydrogen and helium while maintaining a fusion temperature not below approximately 2050° C. The fused material in the lower zone of the crucible is heated by separate induction heating means to produce independent regulation of the temperature in the fused material. The fused material is continuously drawn from the lower zone of the crucible through forming means in the presence of an atmosphere of hydrogen containing a non-oxidizing carrier gas.

Deposition tubes manufactured in accordance with the above-referenced processes necessarily contain hydrogen, since hydrogen is used to protect refractory metal-made furnace parts from oxidation at high temperatures. The hydrogen from the process dissolves into the silica glass. Moreover, the tube inherits a considerable amount of OH from the silica sand itself. As a result, a large quantity of hydrogen is present in the tube drawn from the furnace. The presence of hydrogen in a deposition tube, however, is problematic in that it deteriorates the optical attenuation of the tube.

More particularly, the fused silica glass formed in the above-described processes can be used in the production of a fiber optic preform by the well-known MCVD process wherein the silica glass is in the form of a tube surrounding a core which is built up by vapor deposition of successive layers of suitably doped silica on the inner wall surface of the tube. The tube, after drawing, becomes the outer sheath or cladding of the fiber.

During the MCVD process, any hydrogen present in the tube diffuses towards the deposited optical core and forms various H-bearing species. These species give rise to absorption peaks that adversely affect light transmission at the 1.3 and 1.55 $\mu$m communication windows. The strong OH absorption at 1.38 $\mu$m, in addition, prohibits the use of the 1.2–1.6 $\mu$m wavelength. Elimination of this peak therefore would significantly expand the wavelength range for lightwave transmission. Moreover, as a small fraction of the light is transmitted in the cladding, the presence of hydrogen in the deposition tube itself also deteriorates the attenuation.

One approach for driving out the dissolved hydrogen from the tube entails a heat treatment in a vacuum or other gas environment. However, due to the slow rate constant of the de-hydrogen process at low hydrogen concentration, there is always residual hydrogen left in the tube—typically up to $10^{-6}$ mol/cm$^3$—even after a lengthy heat treatment.

Another approach for reducing the hydrogen content comprises shifting the relevant vibration modes of hydrogen to longer wavelengths to reduce the absorption due to hydrogen in the wavelength region of interest. Such a shift is known to occur by substitution of a heavier atom for hydrogen. Substituting deuterium for hydrogen has the desired effect, since deuterium has approximately double the mass of hydrogen. The deuterium/hydrogen isotope (D/H) exchange results in the appearance of OD absorption lines in the relevant wavelength regime. However, these lines are due to higher overtones, and thus weaker by typically 1–2 orders of magnitude.

A D/H isotope exchange in the tube subsequent to its formation is problematic from a manufacturing standpoint in that it will not effect an isotope exchange of 100%. Moreover, the exchange must be done at a high temperature and high pressure and, in that regard, is difficult to control, particularly when a flammable gas is used. It would therefore be desirable to have available a method for fusing of a silica article in a substantially hydrogen-free gas atmosphere for improved attenuation performance.

SUMMARY OF INVENTION

In an exemplary embodiment of the invention, a method for forming an elongated fused silica article is provided. The method generally comprises feeding a silica or quartz ($SiO_2$) material into a furnace. The $SiO_2$ material is fused in a melting zone of the furnace under a gas atmosphere including molecular deuterium ($D_2$) gas. The article is then drawn from the furnace.

In an alternate exemplary embodiment of the invention, a method for forming an elongated fused silica article is provided wherein quartz ($SiO_2$) material is pretreated with a molecular deuterium gas to undergo D/H exchange in the quartz ($SiO_2$) material prior to fusing of the $SiO_2$ material into the drawn article. This pretreatment step is followed by feeding the pretreated quartz ($SiO_2$) material into a furnace and fusing of the material in a melting zone of the furnace under a gas atmosphere including a deuterium gas or a substantially hydrogen-free gas atmosphere. The article is then drawn from the furnace.

In still another exemplary embodiment of the present invention, an elongated fused quartz article is formed by fusing of a generally quartz ($SiO_2$) material in a gas atmosphere comprising molecular $D_2$ gas.

A principal advantage of the invention is provided by a new and improved silica tube or rod that, typically contains hydrogen-bearing species less than $\frac{1}{100}$ as compared with those fused in the presence of hydrogen, thereby improving the attenuation of the tube. Because the tube or rod is formed in a molecular $D_2$ gas atmosphere, hydrogen is substantially absent in the tube as formed, thus negating the necessity of a D/H isotope exchange.

It should be noted that the terms "quartz" and "silica" are used interchangeably throughout this application, both being directed generally to the compound $SiO_2$. Nonetheless, the present invention encompasses the use of any raw material introduced to the melting furnace, including but not limited to natural silica/quartz and synthetic silica.

It should further be noted that the term "deposition tube" is used throughout this application. However, one of ordinary skill in the art would recognize that the inventive tube is also known as a substrate tube or a cladding tube.

BRIEF DESCRIPTION OF DRAWINGS

The structure, operation and advantages of the present preferred embodiment of this invention will become further apparent upon consideration of the following description, taken in conjunction with the accompanying drawings.

DETAILED DESCRIPTION

Figure 1:
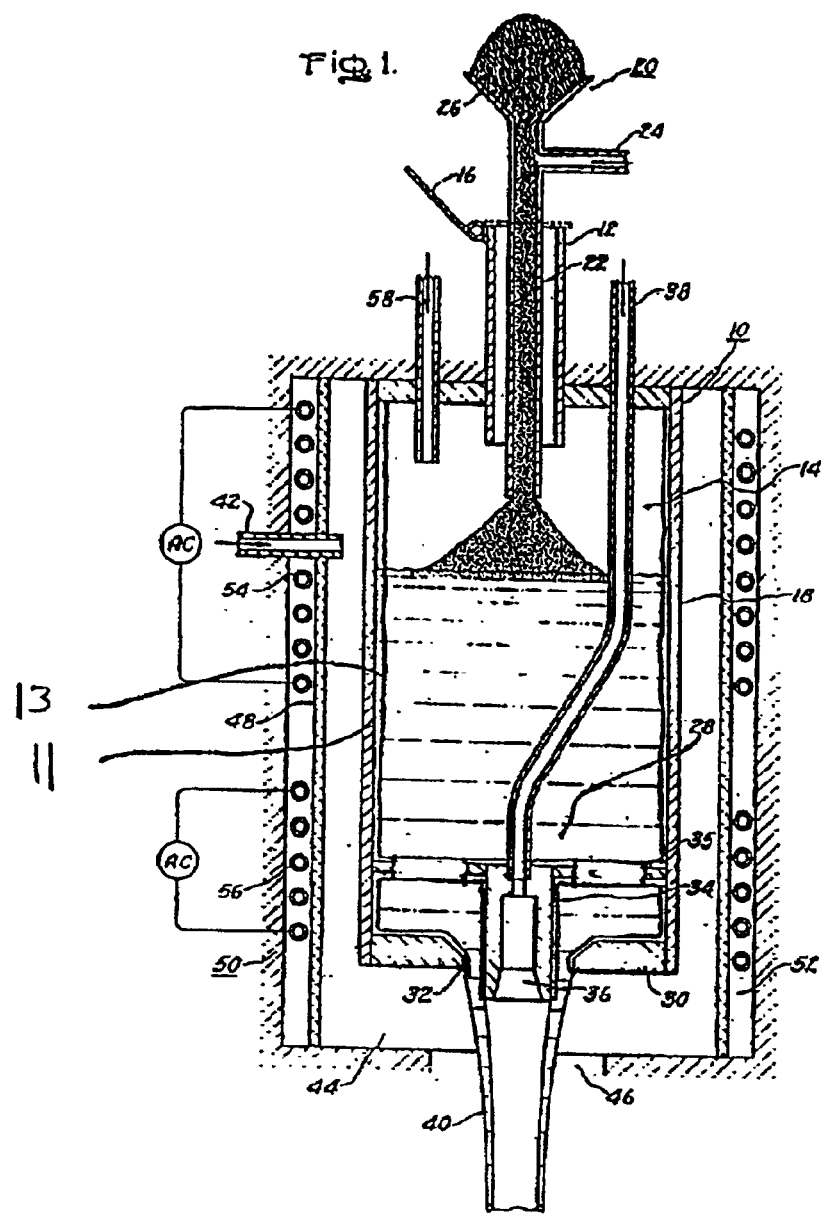
FIG. 1 is a longitudinal sectional view of a furnace useful for fusing the deposition tube of the present invention.

In one of its preferred embodiments, the fused quartz product of the present invention can be formed in a furnace configuration having the features shown in FIG. 1. The furnace has a general cylindrical shape. Preferably, an elongated cylindrical melting crucible 10 constructed of a refractory metal layer 11, such as tungsten or molybdenum as well as combinations thereof, is used.

A silica raw material is fed through a top opening 12 into a melt zone 14 of the crucible member. The top opening 12 is provided with movable closure means 16, such as a trapdoor which can be kept closed except for observing the level of the melt 18 and during feeding of the raw material into the crucible. Automatic feeder means 20 are provided at the top opening of the crucible member to maintain a predetermined level of the raw material in the crucible. The feeder includes a discharge tube 22 having its outlet opening located in the crucible 10 so as to provide the raw material in an upper region where melting takes place, a purge gas inlet tube 24 and reservoir means 26 which contains a supply of the raw material being fed automatically to the discharge tube.

The purge gas being supplied to the feeder helps eliminate gases contained in the raw material which could otherwise form bubbles in the fused quartz melt which cannot thereafter be removed or minimized in a manner to be described in part immediately hereinafter. The composition of the purge gas is generally a gas mixture of deuterium and helium in the volume ratios 40–100% deuterium and 60–0% helium.

The lower portion 28 (a drawing zone) of the crucible 10 includes an annular ring 30 having central opening 32 through which the elongated fused quartz member is continuously formed by drawing the viscous material through the opening. A core 34 is centrally disposed in the opening 32 and extends below—but could extend above —the means of forming tubing from the viscous material being drawn from the melt. As known by the skilled artisan, the position of the core can be shifted as necessary to produce the desired size of extrudate. Support element 35 is affixed to the wall of the crucible and provides rigid support of the core which helps to maintain a constant size opening from which the product is being drawn. The core is fabricated with a hollow interior 36 which is connected to inlet pipe 38 so that a supply of a substantially hydrogen-free gas can be furnished as a forming atmosphere while the tubing 40 is being drawn. One skilled in the art would appreciate that gas would typically contain trace amounts of hydrogen. Thus, "substantially hydrogen-free gas" is intended to include gases containing trace amounts of hydrogen, i.e., up to about 1 vol. % hydrogen-bearing species.

A second inlet pipe 42 supplies what can be a mixture of hydrogen in a non-oxidizing carrier gas such as argon or nitrogen in volume ratios 1–20% hydrogen and 99–80% carrier gas as a protective atmosphere which surrounds the exterior refractory metal wall 11 of the crucible 10. This supply of gas is provided to annular space 44 which provides a housing means for the crucible and includes a central bottom opening 46 providing exhaust means from the cavity for the gas in a manner which envelops the exterior surface of the elongated fused quartz member 40 being drawn from the furnace. The exterior wall of the annular space comprises a refractory cylinder 48 which in combination with exterior housing 50 of the furnace construction serves as the container means for the induction heating coils of the apparatus. More particularly, a concentric passageway 52 is defined between the exterior wall of the refractory cylinder 48 and the interior wall of housing 50 in which is disposed two helical-shaped induction heating coils 54 and 56 supplying separate heating sources for the upper and lower zones of the crucible, respectively. Of course, additional coils may be employed as governed by the size of the furnace, for example, it may be beneficial to include additional coil(s) in the finish zone. In any case, the heating sources and the power supplies thereto can be of conventional construction.

A third supply pipe 58 is located in the top section of exterior housing 50, passing into the crucible 10, allowing a gas mixture to be fed to the melt zone 14 of the crucible. The gas is a molecular deuterium ($D_2$) gas. Inert gases such as nitrogen, helium, argon or the like may also be present in the gas mixture. The gas mixture preferably contains $D_2$ in a volume ratio of >20%, more preferably >90%, and any inert gases, if present, in a volume ratio of <80%, more preferably <10%. The fused article is exposed to the deuterium $D_2$ gas atmosphere for a sufficient time to permit diffusion of deuterium throughout the volume of the article.

In this embodiment, the raw material is provided to the crucible member 10 which has been heated in excess of 2050° C. while also being supplied with the $D_2$ gas mixture hereinbefore specified. The dew point of the $D_2$ gas mixture is preferably from −30° C. to 80° C., more preferably −20° C. to 10° C. and can be higher than 80° C.

By the use of $D_2$ gas in the fusing steps as opposed to $H_2$, $H_2O$, or a combination thereof, it becomes possible to eliminate the presence of hydrogen in the deposition tube. Thus, hydrogen-bearing species are substantially absent in the tube as formed. Typically, a deposition tube formed in an $H_2$ or $H_2O$ environment has approximately 150 ppm OH or other hydrogen-bearing species present in the tube. By use of the inventive process, approximately 1.5 ppm OH or other hydrogen-bearing species are present in the formed tube. Thus by the terminology "substantially absent" it is meant that the formed article contains less than about 1.5 ppm hydrogen-bearing species. Hydrogen in the deposition tube is disadvantageous in that it can diffuse towards the deposited optical core during preform and form various H-bearing species, thereby giving rise to absorption peaks that deteriorate light attenuation. For example, the first overtone OH absorption at 1.38 μm adversely affects light transmission. Fibers operating at this wavelength would suffer 50 dB/km loss per 1 ppm of OH in the fiber core. (Typical commercial fiber is less than 0.5 dB/km). The presence of OH in the starting clad tube can also affect the core performance.

OD, the deuterium equivalent of OH, does not affect attenuation between 1.3 μm to 1.6 μm. The effect of the 1.26 μm OD peak is 1/60 that of the 1.38 μm OH peak for the same water content. The presence of OH in the deposition tube can also affect attenuation as a result of the small fraction of light transmitted to the cladding layer. The amount of deuterium incorporated into the cladding layer by virtue of the preferred fusing process is preferably from $5 \times 10^{-9}$ to $3 \times 10^{-5}$ mol/g in solid.

Moreover, because deuterium has the same chemical property as hydrogen, deuterium also protects furnace parts from oxidation at high temperatures.

In an alternate embodiment of the present invention, the raw material (i.e., the natural silica sand or synthetic silica) is pre-treated in molecular $D_2$ gas or a combination of molecular $D_2$ gas and an inert gas prior to its introduction into the crucible member 10. The dew point of the $D_2$ gas mixture is preferably from −30° C. to 80° C., more preferably from −20° C. to 10° C., and can be higher than 80° C. The pretreatment step may be used in combination with the use of the $D_2$ gas mixture in the crucible member 10. However, in the event the pretreatment step effects a hydrogen content of less than $5 \times 10^{-9}$ mol/g in the raw material, it becomes unnecessary to use the $D_2$ gas mixture in the melt zone. In this case, a vacuum or hydrogen-free gas could be used in the crucible member 10 in place of the $D_2$ gas mixture.

When the deuterium atoms encounter OH present in the raw material, they undergo a reversible exchange reaction with the bound hydrogen, thereby eliminating the presence of hydrogen in the tube. The exchange reaction, i.e.,

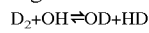
$D_2 + OH \rightleftharpoons OD + HD$

, requires elevated temperatures to proceed at significant rates. About 300 degrees C. is the lower limit for achieving rates of practical interest. The D/H exchange reaction typically can proceed at any temperature above the minimum temperature, up to, and even above the melting temperature of the raw material.

After a predetermined melt level of fused quartz has been established in the crucible and the molten material caused to flow by gravity through central bottom opening 32 in the crucible member, tubing or rod is then drawn continuously by the drawing machine (not shown) in the presence of a forming gas atmosphere as hereinbefore specified. The above-described furnace is operated in connection with conventional tube or rod drawing machinery which has been omitted from the drawing as forming no part of the present invention. In any continuous drawing of tubing/rod in the foregoing described manner, the electrical power being supplied to the lower heating coil 56 is typically maintained at a lower level than the electrical power being supplied to the upper heating coil 54 in order to lower the temperature of the material as it is being drawn to below a temperature of 2050° C. However, the use of a non-reactive lining in the finish zone can allow higher temperature operation if desired.

After forming of the tube, it is preferably heat treated in a substantially hydrogen-free gas or vacuum at 200° C. to 1500° C., more preferably 900° C. to 1200° C.

Optionally, the formed tubing or rod can be baked in the presence of $D_2$ gas to further decrease hydrogen content. Baking reduces the amount of hydrogen-bearing species in the formed tubing by a factor of 100 or about 0.015 ppm. The baking can be done in flowing deuterium or a mixture of a flowing dry gas (e.g., argon) and deuterium at a preferred volume ratio >50% $D_2$ and <50% dry gas. Obviously, $H_2$ gas or $H_2O$ gas would not be used in connection with the baking step. The baking is preferably carried out at a temperature of 200° C. to 1500° C., more preferably 900° C. to 1200° C. The deuterium partial pressure ranges from 50 microns to 1 atmosphere, more preferably 0.5 to 1.0 atm. The deuterium pressure can exceed 1 atmosphere, however.

As readily appreciated by one of ordinary skill in the art, the subject invention is applicable to many other processes used for the fusing of a silica deposition tube, including a flame fusion process, a flame hydrolysis process, a plasma fusion process and a vacuum fusion process. For example, using the subject invention in connection with a flame fusion process, quartz ($SiO_2$) material or deuterated quartz ($SiO_2$) material is fused using a deuterium torch to form a solid fused $SiO_2$ material with a low hydrogen content. In a flame hydrolysis process, $D_2O$ resulting from the combustion of deuterium or deuterated natural gas in oxygen is reacted with $SiCl_4$ for fusing of a solid material having a low hydrogen content. Using a plasma fusion process, the $SiO_2$ material or deuterated $SiO_2$ material is fused in a dry ambient $D_2$ gas mixture to form the fused silica material. Lastly, a vacuum fusion process could be utilized wherein $SiO_2$ material or deuterated $SiO_2$ material is fused in a vacuum or a $D_2$ gas mixture to form the fused solid silica material with a low hydrogen content.

Figure 2:
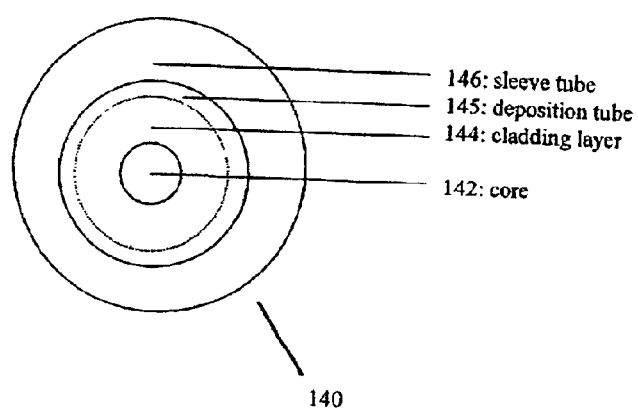
FIG. 2 is an end-sectional view of a typical optical fiber preform.

Referring now to FIG. 2, the formed silica tube of the present invention is particularly applicable to an optical fiber preform 140, comprising an optical fiber core 142 surrounded by a cladding layer 144 of silica and fabricated by the MCVD process or any other processes using a quartz tube known to those skilled in the art. Optical fibers are thin strands of glass capable of transmitting an optical signal containing a large amount of information over long distances with very low loss. Optical fibers are typically manufactured by constructing an optical fiber preform of appropriate composition and drawing fiber from the preform.

In the well-known MCVD process, a gas phase precursor and oxygen are introduced into the deposition tube 145 in the form of a constantly moving stream. The deposition tube 145 and its contents are heated to homogeneous reaction temperature within a moving hot zone produced by a moving heating means constantly traversing the outside surface of the deposition tube 145. Homogeneously produced glass particles ("soot") collect on the walls of the deposition tube 145, and are fused into a continuous layer or cladding layer 144 within the moving hot zone. The deposition tube 145 within which the formation is taking place is continuously rotated about its own axis. Reactant materials include chlorides and hydrides, as well as other compounds which will react with oxygen as described. As in other vapor reaction processes, other gaseous material may be introduced to act as a carrier or to act as a diluent.

Continuous fusion within the hot zone and the resultant thickness uniformity of deposit facilitates formation of graded index structures. Gradients may be produced by varying reactant composition with a ratio of high index-producing dopant increasing with successive hot zone traversals. Since reaction conditions for different constituents in the reactant mix are different, it is possible to produce a gradient by altering temperature and/or flow rate during processing.

Typical reaction temperatures maintained at least at the wall of the deposition tube 145 are within the range of from 1200 to 1600° C. These temperatures are responsible for rapidity of preform production. Particularly at the high temperature end of the range, distortion of the usually silica deposition tube 145 is avoided by rotation. Narrow zones, increased rotation speed and vertical disposition of the tube 145 may all contribute to the avoidance of tube distortion.

Preforms adequate for preparation of one or a few kilometers of fiber may be prepared during deposition periods of one or a few hours. The preforms are prepared by conventional processing of the deposited product to a rod. In usual processing, the deposition tube 145 which served as the deposition substrate becomes part of the rod. It may be composed of pure silica or of silica which has been doped to alter generally to reduce its index. Variations may include removal of the deposition tube 145, as well as deposition of additional material on the outer surface. The deposition tube 145 serving as a substrate during deposition may be retained as a part of the rod, around which a sleeve tube 146 can be shrunk later by collapse of the sleeve tube over the rod. The addition of the sleeve tube 146 increases the cross-sectional area of the optical fiber preform 140 and, accordingly, its strength. The sleeve tube 146 is also preferably manufactured in accordance with the process of the present invention as light may also be carried in the sleeve tube 146 of the final fiber. The deposit typically is porous and needs to be consolidated into a homogeneous state before it is capable of low-loss transmission of light. This consolidation is typically achieved by appropriate application of heat and in the MCVD process is applied intermittently throughout the period of deposition.

EXAMPLES

A series of deposition tube products were drawn from a furnace of the embodiment of FIG. 1 equipped with a tungsten crucible. The crucible was heated to 2100° C. while being supplied with 100 vol. % molecular $D_2$ gas having a dew point of −40° C. and a synthetic silica raw material. The deposition tubes were baked in a vacuum baked oven at 1100° C. The tubes thus produced contain less than $10^{-9}$ mol/cm$^3$ hydrogen. The decrease of contribution of hydrogen to attenuation is evidenced by the significant reduction of the 1383 nm OH absorption in optical fiber made from the tubes as compared to tubes formed in the presence of hydrogen by a prior art process, as shown in Table I.

TABLE I

| Improvement of 1383 nm Attenuation | | | | | |
|---|---|---|---|---|---|
| | Deuterated Tube 1 | Deuterated Tube 2 | Deuterated Tube 3 | Deuterated Tube 4 | Prior Art Tubes |
| Excess loss at 1383 nm | 0.055 | 0.037 | 0.057 | 0.049 | 0.075–0.107 |

While the invention has been described by reference to preferred embodiments, it will be understood by those skilled in the art that various changes may be made and equivalents may be substituted for elements without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but the invention will include all embodiments falling within the scope of appended claims.

What is claimed is:

1. A method for forming an elongated fused quartz article comprising the steps of:
   a) feeding a generally quartz ($SiO_2$) material into a furnace;
   b) fusing the quartz ($SiO_2$) material in a melting zone of the furnace under a gas atmosphere comprising a molecular deuterium ($D_2$) gas wherein the dew point of the gas atmosphere is about −30° C. to about 80° C.;
   c) drawing the article from the furnace; and
   d) optionally, baking the article in a gas atmosphere comprising a deuterium gas wherein the gas atmosphere of steps b) or d) further comprises an inert gas or a mixture of inert gases.

2. The method of claim 1 further comprising the step of heat treating the article drawn from the furnace in a substantially hydrogen-free gas atmosphere or vacuum.

3. The method of claim 1 wherein the $D_2$ gas and inert gas or mixture of inert gases are present in a volume ratio of about 20% $D_2$ and about 10% inert gas or mixture of inert gases.

4. The method of claim 1 wherein the $D_2$ gas and inert gas or mixture of inert gases are present in a volume ratio of about 90% $D_2$ and about 10% inert gas or mixture of inert gases.

5. The method of claim 1 being a continuous process.

6. The method of claim 1 wherein the article is a deposition tube.

7. The method of claim 6 wherein the deposition tube has a hydrogen content of about $5 \times 10^{-11}$ mol/g to about $5 \times 10^{-8}$ mol/g.

8. The method of claim 1 wherein the article is a sleeve tube.

9. The method of claim 1 wherein the baking is carried out at a temperature of about 200° C. to about 1500° C.

10. A method for forming an elongated fused quartz article comprising the steps of:
   a) pretreating a generally quartz ($SiO_2$) material in a gas atmosphere comprising a molecular deuterium ($D_2$) gas;
   b) feeding the pretreated quartz ($SiO_2$) material into a furnace;
   c) fusing the pretreated quartz ($SiO_2$) material in a melting zone of the furnace under a gas atmosphere comprising a molecular deuterium (D$_2$) gas or a substantially hydrogen-free gas;

d) drawing the fused SiO$_2$ material article from the furnace to form the article; and e) heat treating the drawn article in a substantially hydrogen-free gas atmosphere or vacuum.

11. The method of claim 10 being a continuous process.

12. The method of claim 10 wherein the article is a deposition tube.

13. The method of claim 10 wherein the article is a sleeve tube.

14. The method of claim 10 further comprising the step of:

f) baking the fused SiO$_2$ article in a gas atmosphere comprising a deuterium gas.

15. A method for forming an elongated fused quartz article comprising the steps of:

a) feeding a generally quartz (SiO$_2$) material into a furnace;

b) fusing the quartz (SiO$_2$) material in a melting zone of the furnace under a gas atmosphere comprising a molecular deuterium (D$_2$) gas;

c) drawing the article from the furnace; and d) optionally, baking the article in a gas atmosphere comprising a deuterium gas wherein the gas atmosphere of steps b) or d) further comprises an inert gas or a mixture of inert gases and wherein the dew point of the gas atmosphere of step b) is about −30° C. to about 80° C.

16. The method of claim 15, wherein the dew point of the gas atmosphere of step b) is about −20° C. to about 10° C.

17. A method for forming an elongated fused quartz article comprising the steps of:

a) feeding a generally quartz (SiO$_2$) material into a furnace;

b) fusing the quartz (SiO$_2$) material in a melting zone of the furnace under a gas atmosphere comprising a molecular deuterium (D$_2$) gas wherein the dew point of the gas atmosphere is about −20° C. to about 10° C.;

c) drawing the article from the furnace; and d) optionally, baking the article in a gas atmosphere comprising a deuterium gas wherein the gas atmosphere of steps b) or c) further comprises an inert gas or a mixture of inert gases.

* * * * *